US010922486B2

(12) United States Patent
Srivatsa et al.

(10) Patent No.: US 10,922,486 B2
(45) Date of Patent: Feb. 16, 2021

(54) PARSE TREE BASED VECTORIZATION FOR NATURAL LANGUAGE PROCESSING

(71) Applicant: International Business Machines Corporation, Armonk, NY (US)

(72) Inventors: Mudhakar Srivatsa, White Plains, NY (US); Raghu Kiran Ganti, Elmsford, NY (US); Yeon-sup Lim, White Plains, NY (US); Shreeranjani Srirangamsridharan, White Plains, NY (US); Antara Palit, Ithaca, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 16/352,358

(22) Filed: Mar. 13, 2019

(65) Prior Publication Data
US 2020/0293614 A1 Sep. 17, 2020

(51) Int. Cl.
G06F 40/279 (2020.01)
G06F 40/211 (2020.01)
G06F 40/30 (2020.01)
G06F 40/284 (2020.01)

(52) U.S. Cl.
CPC .......... *G06F 40/211* (2020.01); *G06F 40/284* (2020.01); *G06F 40/30* (2020.01)

(58) Field of Classification Search
CPC ..... G06F 40/274; G06F 40/279; G06F 40/284
See application file for complete search history.

(56) References Cited

U.S. PATENT DOCUMENTS

| 6,983,239 B1 | 1/2006 | Epstein |
| 8,392,436 B2 | 3/2013 | Bai et al. |
| 2015/0220833 A1 | 8/2015 | Le |

(Continued)

FOREIGN PATENT DOCUMENTS

| CN | 1162789 C | 8/2004 |
| CN | 100535895 C | 9/2009 |

(Continued)

OTHER PUBLICATIONS

Q. Le and T. Mikolov. Distributed representations of sentences and documents. In Proceedings of the 31st International Conference on International Conference on Machine Learning—vol. 32, ICML'14, pp. II-1188-II-1196, 2014.

(Continued)

*Primary Examiner* — Daniel Abebe
(74) *Attorney, Agent, or Firm* — Garg Law Firm, PLLC; Rakesh Garg; Joseph Petrokaitis

(57) ABSTRACT

A parse tree corresponding to a portion of narrative text is constructed. The parse tree includes a data structure representing a syntactic structure of the portion of narrative text as a set of tokens according to a grammar. Using a token in the parse tree as a focus word, a context window comprising a set of words within a specified distance from the focus word is generated, the distance determined according to a number of links of the parse tree separating the focus word and a context word in the set of words. A weight is generated for the focus word and the context word. Using the weight, a first vector representation of a first word is generated, the first word being within a second portion of narrative text.

20 Claims, 9 Drawing Sheets

(56) References Cited

U.S. PATENT DOCUMENTS

| | | | |
|---|---|---|---|
| 2016/0328388 A1 | 11/2016 | Cao et al. | |
| 2017/0011289 A1 | 1/2017 | Gao | |
| 2017/0192956 A1 | 7/2017 | Kaiser | |
| 2018/0189269 A1* | 7/2018 | Quirk | G06F 40/289 |
| 2019/0057310 A1* | 2/2019 | Olmstead | G06F 40/211 |
| 2019/0065505 A1* | 2/2019 | Fukuda | G06F 40/30 |
| 2019/0384824 A1* | 12/2019 | Burchard | G06F 40/30 |
| 2020/0134263 A1* | 4/2020 | Oh | G06F 40/30 |

FOREIGN PATENT DOCUMENTS

| | | |
|---|---|---|
| CN | 103218432 A | 7/2013 |
| CN | 104375989 A | 2/2015 |
| CN | 104391963 A | 3/2015 |
| CN | 105183714 A | 12/2015 |

OTHER PUBLICATIONS

V. E. Liong, J. Lu, G. Wang, P. Moulin, and J. Zhou. Deep hashing for compact binary codes learning. In 2015 IEEE Conference on Computer Vision and Pattern Recognition (CVPR), pp. 2475-2483, 2015.

C. D. Manning, M. Surdeanu, J. Bauer, J. Finkel, S. J. Bethard, and D. McClosky. The Stanford CoreNLP natural language processing toolkit. In Association for Computational Linguistics (ACL) System Demonstrations, pp. 55-60, 2014.

T. Mikolov, I. Sutskever, K. Chen, G. S. Corrado, and J. Dean. Distributed representations of words and phrases and their compositionality. In Advances in Neural Information Processing Systems 26, pp. 3111-3119, 2013.

Jayant Krishnamurthy and Tom Mitchell. 2013. Vector space semantic parsing: A framework for compositional vector space models. In Proceedings of the ACL Workshop on Continuous Vector Space Models and their Compositionally.

* cited by examiner

FIGURE 5

SENTENCE 510

THE DOLLAR HAS HIT ITS HIGHEST LEVEL AGAINST THE EURO IN ALMOST THREE MONTHS AFTER THE FEDERAL RESERVE HEAD SAID THE US TRADE DEFICIT IS SET TO STABILIZE.

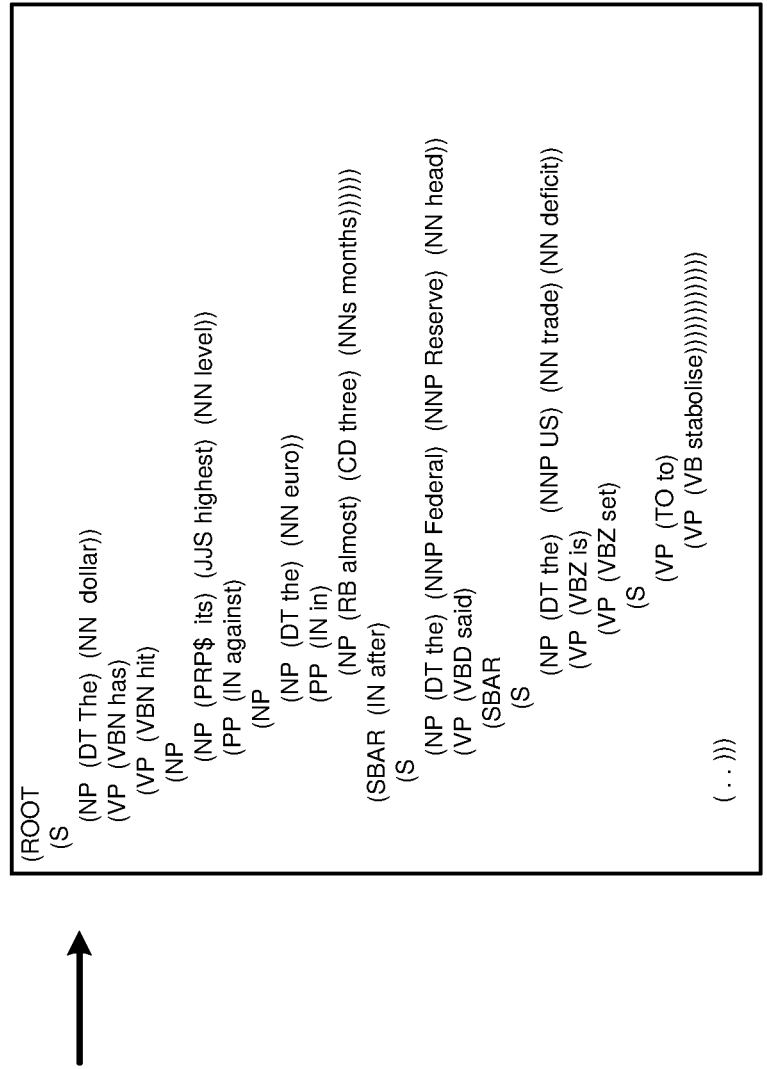

PARSE TREE 520

```
(ROOT
  (S
    (NP (DT The) (NN dollar))
    (VP (VBN has)
      (VP (VBN hit)
        (NP
          (NP (PRP$ its) (JJS highest) (NN level))
          (PP (IN against)
            (NP
              (NP (DT the) (NN euro))
              (PP (IN in)
                (NP (RB almost) (CD three) (NNs months))))))
        (SBAR (IN after)
          (S
            (NP (DT the) (NNP Federal) (NNP Reserve) (NN head))
            (VP (VBD said)
              (SBAR
                (S
                  (NP (DT the) (NNP US) (NN trade) (NN deficit))
                  (VP (VBZ is)
                    (VP (VBZ set)
                      (S
                        (VP (TO to)
                          (VP (VB stabolise)))))))))))))
    (. . .)))
```

PARSE TREE BASED VECTORIZATION FOR NATURAL LANGUAGE PROCESSING

GOVERNMENT RIGHTS

This invention was made with Government support under W911NF-16-3-0001 awarded by Army Research Office (ARO). The Government has certain rights in this invention.

TECHNICAL FIELD

The present invention relates generally to a method, system, and computer program product for vectorization for natural language processing. More particularly, the present invention relates to a method, system, and computer program product for parse tree based vectorization for natural language processing.

BACKGROUND

Vectorization, or embedding, is a collective name for a set of language modeling and feature learning techniques in natural language processing (NLP) in which a unit of narrative text is mapped to a corresponding vector of real numbers. A unit of narrative text can be a portion of a word (e.g. a root portion of a word, a plural noun with a final 's' removed), a word, a phrase, a sentence, a group of sentences, or another unit of narrative text according to the grammar of the language of the narrative text. Unless expressly disambiguated, the term word as used herein refers to the smallest unit of narrative text in a given language for which a model determines a vector. The term word may include more than one natural language word, or only a portion of a natural language word. Similarly, unless expressly disambiguated the term sentence, as used herein, refers to a portion of narrative text that includes one or more words according to the grammar of the language of the narrative text. The term sentence, as used herein, may actually include only a portion of a natural language sentence, or more than one natural language sentence.

As well, although examples herein are taken from the English language and refer to grammar features of English, the techniques disclosed herein are equally applicable to languages other than English. A vector is a representation of a unit of narrative text. A vector is an array of real numbers, typically between zero and one, but not limited thereto. The array has a large number of dimensions—for example, 300. However, as long as the vector range and number of dimensions are consistent when training and using a particular model, the exact range and number of dimensions are unimportant.

For use in NLP, vectors are assigned such that words that share common contexts have corresponding vectors that are close together, as measured by a distance measure. One such distance measure is cosine similarity. Cosine similarity is a measure of similarity between two non-zero vectors determined by the cosine of the angle between the vectors. As a result, relationships such as analogies can be solved simply, using vector arithmetic on the corresponding vectors. For example, performing the vector calculation vec("Madrid")−vec("Spain")+vec("France") results in a vector that is closer to vec("Paris") than to any other word vector. As well, because vector representations are numbers rather than text strings, vectors can be conveniently input to other neural networks to perform other NLP tasks. For example, vectorization is helpful in sentiment analysis, natural language understanding, and classification.

One group of related neural network models used to assign vectors is known as word2vec. These models are typically two-layer neural networks. Once trained, such models take as their input a large corpus of narrative text and assign each unique word in the corpus a corresponding vector, such that words that share common contexts in the corpus have vectors that are correspondingly close to each other.

Doc2vec, an extension of the word2vec concept, learns and produces document-specific vector representations of words. In other words, doc2vec extends word2Vec models by learning a word's vector representation based on a specific document rather than a generic text corpus. This is helpful when processing specialized narrative text, in which some vocabulary has a document-specific or domain-specific meaning. Other models, also extensions of the word2vec concept, also learn and produce vector representations of words, phrases, sentences, and other units of narrative text.

Models that assign vectors must be trained before use, using words that are a context for the focus word within the narrative text. The models typically use, as training data, pairs of words, from a corpus of narrative training text. One half of each pair is called a focus word. The other half of each pair is selected from a linear context window associated with the focus word. The linear context window includes words, within a sentence in the narrative text, that are within a specified linear distance from the focus word in the document containing the narrative text. The specified distance is referred to as the size of the context window. Training using data assembled in this manner trains a model using words that are a context for the focus word within the narrative text.

For example, for the sentence, "The quick brown fox jumped over the lazy dog," assume the focus word is "fox". If the linear context window has a size equal to two, the linear context window includes "quick", "brown", "jumped", and "over". As a result, training data pairs could include (fox, quick), (fox, brown), (fox, jumped), and (fox, over). If the linear context window has a size equal to three, the linear context window also includes the first and second instances of "the", and training data pairs could also include two instances of (fox, the).

A context window may be constant or dynamic. When using a constant context window, all training data pairs are weighted equally, regardless of distance from the focus word. Thus, continuing the example using a constant linear context window, both (fox, quick) and (fox, brown) would have the same weight, even though "quick" is further than "brown" from "fox" in the sentence.

In contrast, when using a dynamic context window, training data pairs are weighted unequally, according to distance from the focus word. Using a dynamic context window reflects the observation that words closer to the focus word are often more important than words further away when evaluating the focus word within narrative text.

One dynamic context window method weights training pairs inversely proportionally to distance from the focus word. For example, for a context window size of 3, a training pair including a word adjacent to the focus word would be weighted as 3/3, or 1, a training pair including the next word out from the focus word would be weighted as 2/3, or 0.67, and a training pair including the next word out from the focus word would be weighted as 1/3, or 0.33. Thus, continuing the example using a dynamic linear context window of size 3, (fox, quick) would have a weight of 1/3, while (fox, brown) would have a weight of ⅔, because "quick" is further than "brown" from "fox" in the sentence.

Another dynamic context window method weights training pairs according to distance from the focus word, where the weight for a word at distance k from the focus word is equal to exp(−alpha*k), where alpha is a constant.

A parse tree is an ordered, rooted tree that represents the syntactic structure of a portion of narrative text according to a grammar. Each node of the tree is a token. Each token includes a label and optionally, a word of the narrative text. The label for a non-terminal node of the tree describes the group of nodes below the node. The label for a terminal node (i.e., a node with no subordinate nodes) describes the node itself. For example, a parse tree for a sentence could include a root node with a sentence label, nodes labeled noun phrase and verb phrase immediately below the root, and terminal nodes describing each word in the noun phrase and the verb phrase.

SUMMARY

The illustrative embodiments provide a method, system, and computer program product. An embodiment includes a method that constructs a parse tree corresponding to a portion of narrative text, wherein the parse tree comprises a data structure representing a syntactic structure of the portion of narrative text as a set of tokens according to a grammar. An embodiment generates, using a token in the parse tree as a focus word, a context window comprising a set of words within a specified distance from the focus word, the distance determined according to a number of links of the parse tree separating the focus word and a context word in the set of words. An embodiment generates, for the focus word and the context word, a weight. An embodiment generates, using the weight, a first vector representation of a first word, the first word being within a second portion of narrative text.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts another example of parse tree generation in conjunction with parse tree based vectorization for natural language processing in accordance with an illustrative embodiment;

DETAILED DESCRIPTION

Figure 1:
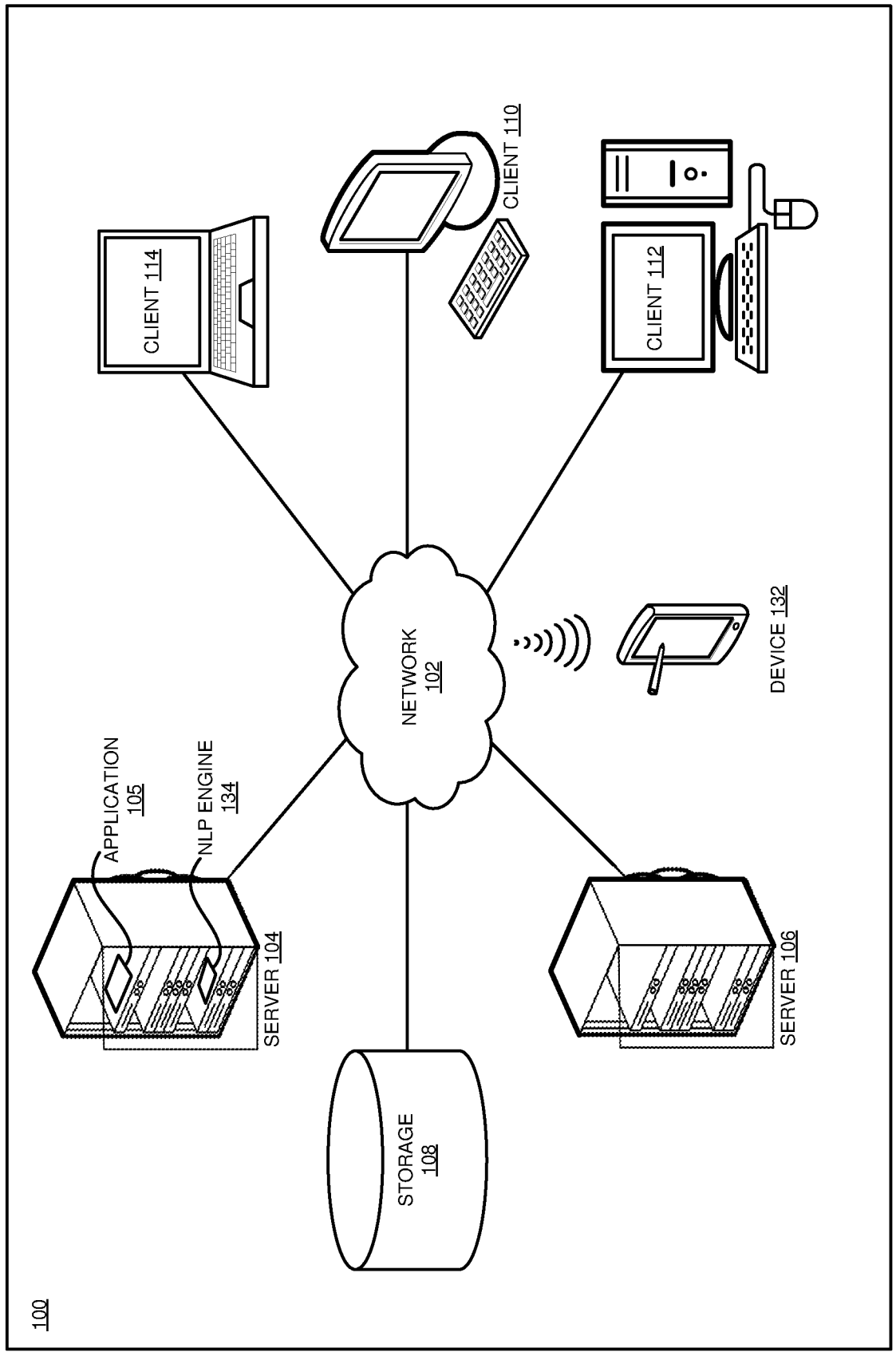
FIG. 1 depicts a block diagram of a network of data processing systems in which illustrative embodiments may be implemented.

The illustrative embodiments recognize that assembling training data according to linear context, using words that precede and follow a focus word in a sentence, fails to take into account the underlying structure of sentences. Sentences within some types of documents may be predominantly long, complex, or include compound phrases. If a context window is relatively short compared to the typical size of grammatical units within the narrative text used for training, the context window may not capture the full context around many words in the corpus. Similarly, sentences within other types of documents may be predominantly short, simple, or without many noun or verb modifiers. If a context window is relatively long compared to the typical size of grammatical units within the narrative text used for training, the context window may capture extraneous words, diluting the context around many words in the corpus.

For example, consider the sentence, "The dollar has hit its highest level against the euro in almost three months after the Federal Reserve head said the US trade deficit is set to stabilize." If the focus word is "euro", a context window with a size of 8 would be needed to capture the relationship between "euro" and "dollar". However, if a corpus contains mostly short sentences—for example, "The cat sat on the mat"—a context window with a size of 8 would be too large to capture context effectively.

However, adjusting the size of the context window based on the document type requires document-specific or document-type-specific analysis and experimentation, adding additional time, expense, and human expert time to the training of vectorization models. Thus, the illustrative embodiments recognize that determining a context window based on a measure that takes sentence structure into account is needed.

The illustrative embodiments recognize that the presently available tools or solutions do not address these needs or provide adequate solutions for these needs. The illustrative embodiments used to describe the invention generally address and solve the above-described problems and other problems related to parse tree based vectorization for natural language processing.

An embodiment can be implemented as a software application. The application implementing an embodiment can be configured as a modification of an existing vectorization system, as a separate application that operates in conjunction with an existing vectorization system, a standalone application, or some combination thereof.

Particularly, some illustrative embodiments provide a method by which vectorization training data based on parse tree distance instead of context window size can be assembled and used to train a vectorization model.

To generate vectorization training data from a corpus of training text, an embodiment constructs a parse tree corresponding to the corpus. In one embodiment, the parse tree represents the entire corpus. Another embodiment divides the corpus into portions and constructs a separate parse tree for each portion. A portion can be a single sentence, paragraph, document section, or another subset of the corpus, e.g., a different grammatical structure used in a particular language of the corpus.

Several different types of parse tree generation techniques are known to those of ordinary skill in the art. For example, top-down parsing techniques begin with a set of grammar rules, then determine which particular words and phrases of the input text comply with the rules. Bottom-up parsing techniques begin with words of the input text, and determine which grammar rules apply to particular words. Combinations of top-down and bottom-up techniques are also possible.

For example, consider a sentence within a corpus: "In addition to skiing another popular attraction is hot air ballooning." A corresponding parse tree for this sentence, using one particular parse tree labeling scheme, is:

```
(ROOT
  (S
    (PP (IN In)
      (NP
        (NP (NN addition))
        (PP (TO to)
          (NP (NN skiing)))))
    (NP (DT another) (JJ popular) (NN attraction))
    (VP (VBZ is)
      (NP (JJ hot) (NN air) (NN ballooning)))
    (. .) ) )
``` where each capitalized word is a node label and each sentence-capitalized word is a word from the narrative text. In particular, ROOT denotes the root of the tree, S denotes a simple declarative clause, PP denotes a prepositional phrase, IN denotes a preposition, NP denotes a noun phrase, NN denotes a noun, TO denotes the word "to", DT denotes a determiner, JJ denotes an adjective, VP denotes a verb phrase, and VBZ denotes a verb in the third person singular present form. Thus, for example, the word "skiing" is a singular noun that is also the only word in a noun phrase. "Hot air ballooning" is another noun phrase, composed of the determiner "hot", the noun "air", and the noun "ballooning".

As another example, consider a more complex sentence: "The dollar has hit its highest level against the euro in almost three months after the Federal Reserve head said the US trade deficit is set to stabilize." A corresponding parse tree for this sentence, using the same parse tree labeling scheme, is:

```
(ROOT
  (S
    (NP (DT The) (NN dollar))
    (VP (VBZ has)
      (VP (VBN hit)
        (NP
          (NP (PRP$ its) (JJS highest) (NN level))
          (PP (IN against)
            (NP
              (NP (DT the) (NN euro))
              (PP (IN in)
                (NP (RB almost) (CD three) (NNS months))))))
        (SBAR (IN after)
          (S
            (NP (DT the) (NNP Federal) (NNP Reserve) (NN head))
            (VP (VBD said)
              (SBAR
                (S
                  (NP (DT the) (NNP US) (NN trade) (NN deficit))
                  (VP (VBZ is)
                    (VP (VBN set)
                      (S
                        (VP (TO to)
                          (VP (VB stabilize)))))))))))))
    (. .)))
``` where, in addition to the labels defined herein, PRP$ denotes a possessive pronoun, JJS denotes a superlative adjective, RB denotes an adverb, CD denotes a cardinal number, NNS denotes a plural noun, SBAR denotes a clause introduced by a subordinating conjunction, and VBD denotes a verb in the past tense.

An embodiment selects a token, or node, of a parse tree as a focus word. An embodiment also determines a context window relative to the focus word. In particular, the context window is determined not according to a linear distance within a sentence, but according to a number of links of the parse tree separating the focus word from a word within the context window. To count the number of links separating tokens in the parse tree, an embodiment begins at a starting node and proceeds up or down the tree, as appropriate, to a destination node. Each time the embodiment proceeds from a node to the node's parent or child, if the next node is non-empty, the link count is incremented by 1.

Thus, the example sentence, "The dollar has hit its highest level against the euro in almost three months after the Federal Reserve head said the US trade deficit is set to stabilize," has a corresponding parse tree described herein. If the focus word is "euro", "its", "highest", "level", "against", "the", and "in" are all one link away from "euro". Thus, if the context window has a size of one, "its", "highest", "level", "against", "the", and "in" are all within the context window. "Hit", "almost", "three", and "months" are all two links away from "euro". Thus, if the context window has a size of two, "hit", "almost", "three", and "months" are also within the context window. And "has" is three links away from "euro". Thus, if the context window has a size of three, "has" is also within the context window.

An embodiment generates pairs of training data. One half of the pair is the focus word. The other half of the pair is a word within the context window of the focus word.

An embodiment generates a weight corresponding to each pair of training data. In one embodiment, all pairs of training data are weighted equally—for example, with weight equal to one. In another embodiment, the weight varies based on the distance, in terms of links of the parse tree, between the focus word and the context word.

In one embodiment, the weight is equal to the context window size minus the parse tree distance, divided by the context window size. Thus, for a context window of size 3, the weight for a context word one link away from the focus word is 3/3, the weight for a context word two links away from the focus word is ⅔, and the weight for a context word three links away from the focus word is ⅓.

In another embodiment, the weight decreases exponentially with parse tree distance from the focus word. Other weighting schemes are also possible and contemplated within the scope of the illustrative embodiments.

An embodiment uses the weighted pairs of training data to train an encoding neural network to determine vector representations of words based on the words' semantic similarity. In particular, during training the embodiment applies weighted pairs of training data to the inputs of an encoding neural network. The network learns that pairs of training data are similar to each other. Then, once the network is trained, weights within the trained network determine the vector representation of an input word. Alternatively, an embodiment generates weighted pairs of training data based on parse tree distance, then passes the generated training data to a prior-art implementation to perform the actual training.

The manner of parse tree based vectorization for natural language processing described herein is unavailable in the presently available methods in the technological field of endeavor pertaining to natural language processing. A method of an embodiment described herein, when implemented to execute on a device or data processing system, comprises substantial advancement of the functionality of that device or data processing system in generating training data based on parse tree distance from a focus word.

The illustrative embodiments are described with respect to certain types of words, partial words, clauses, sentences, units of narrative text, parse trees, distances, context windows, vectors, embeddings, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
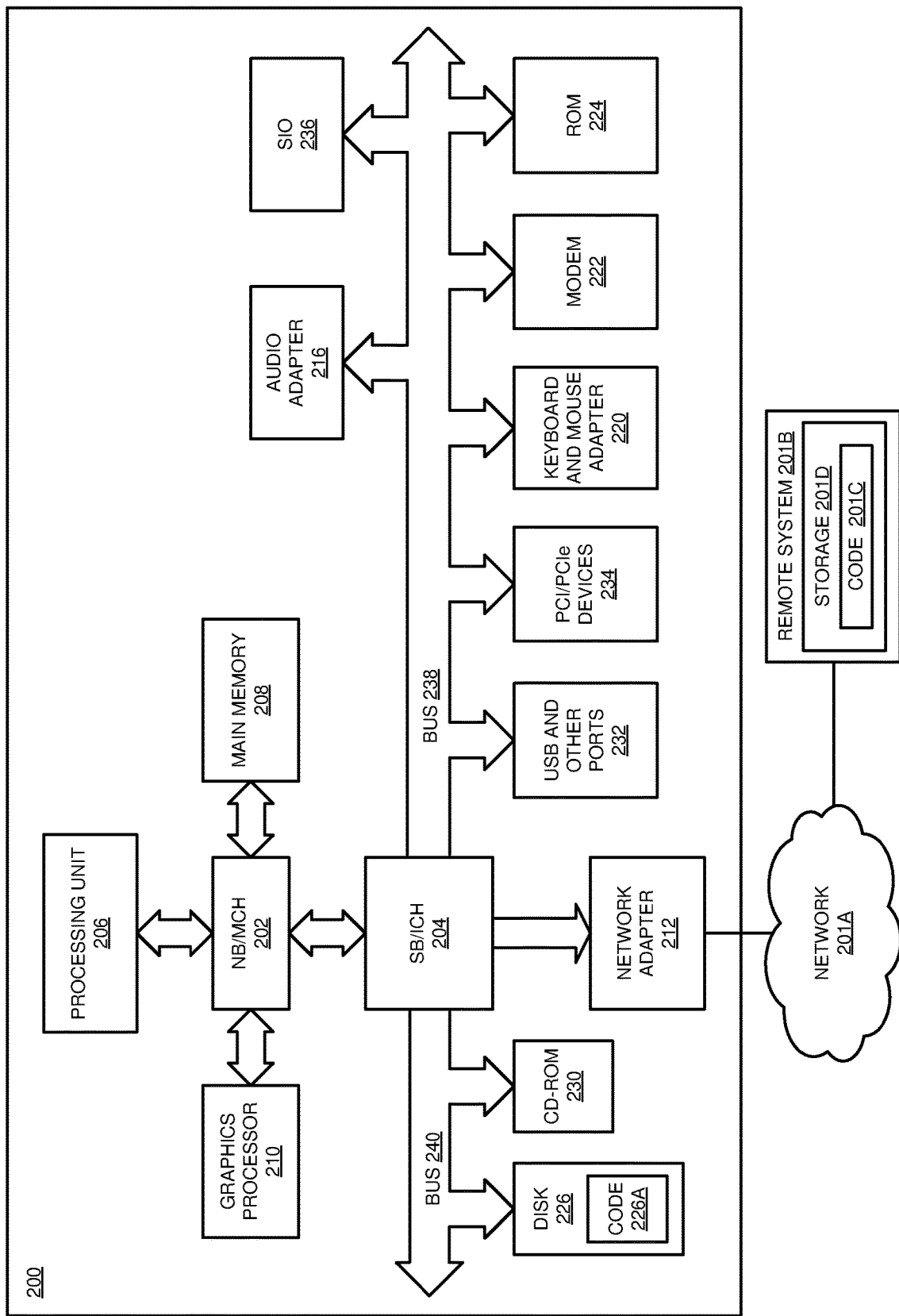
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 makes use of NLP engine 134 to perform NLP-related tasks in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
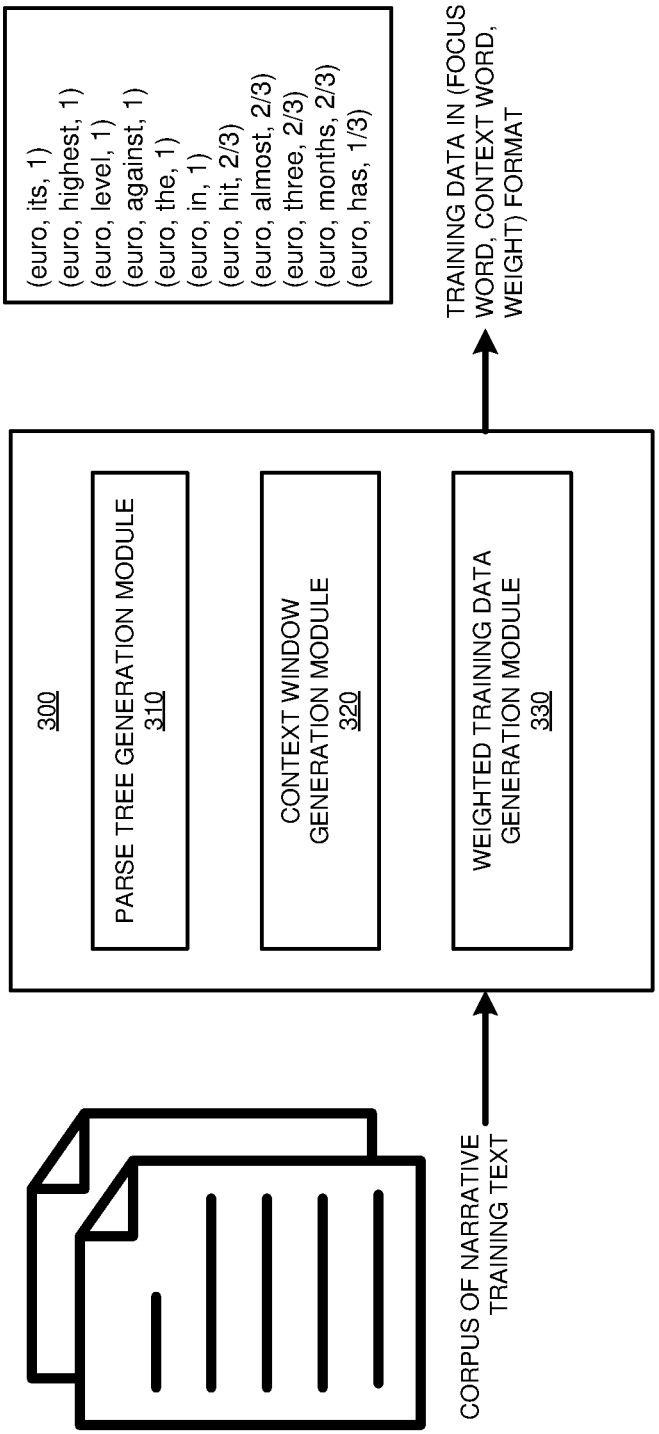
FIG. 3 depicts a block diagram of an example configuration for parse tree based vectorization for natural language processing in accordance with an illustrative embodiment.

With reference to FIG. 3, this figure depicts a block diagram of an example configuration for parse tree based vectorization for natural language processing in accordance with an illustrative embodiment. Application 300 is an example of application 105 in FIG. 1 and executes in any of servers 104 and 106, clients 110, 112, and 114, and device 132 in FIG. 1.

Application 300 takes as input a corpus of narrative training text, and produces as output a corresponding set of training data. In particular, parse tree generation module 310 constructs a parse tree corresponding to the corpus. In one implementation, module 310 generates a parse tree that represents the entire corpus. In another implementation, module 310 divides the corpus into portions and constructs a separate parse tree for each portion. A portion can be a single sentence, paragraph, document section, or another subset of the corpus. Module 310 uses any suitable parse tree generation technique, such as a top-down, bottom-up, or combination technique.

Context window generation module 320 selects a token, or node, of a parse tree as a focus word. Module 320 also determines a context window relative to the focus word. In particular, the context window is determined according to a number of links of the parse tree separating the focus word from a word within the context window.

Weighted training data generation module 330 generates pairs of training data. One half of the pair is the focus word. The other half of the pair is a word within the context window of the focus word. Module 330 also generates a weight corresponding to each pair of training data.

Figure 4:
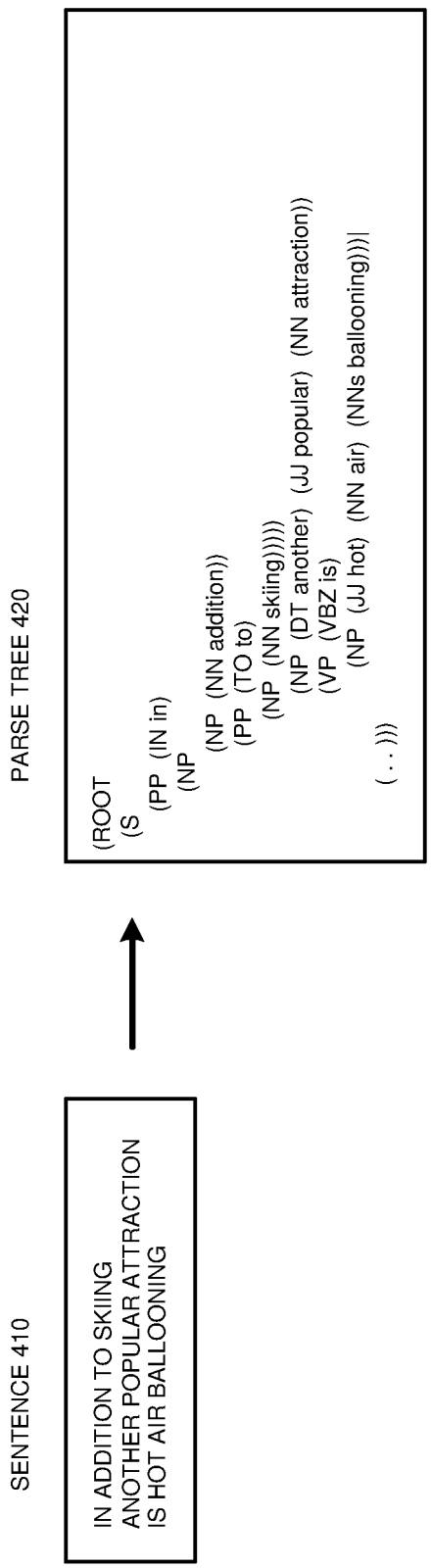
FIG. 4 depicts an example of parse tree generation in conjunction with parse tree based vectorization for natural language processing in accordance with an illustrative embodiment.

With reference to FIG. 4, this figure depicts an example of parse tree generation in conjunction with parse tree based vectorization for natural language processing in accordance with an illustrative embodiment. Application 300 in FIG. 3 can be used to generate the depicted parse tree.

Sentence 410 is an exemplary sentence within a corpus: "In addition to skiing another popular attraction is hot air ballooning." From sentence 410, application 300 produces parse tree 420 using one particular parse tree labeling scheme, is:

```
(ROOT
    (S
        (PP (IN In)
            (NP
                (NP (NN addition))
                (PP (TO to)
                    (NP (NN skiing)))))
        (NP (DT another) (JJ popular) (NN attraction))
        (VP (VBZ is)
            (NP (JJ hot) (NN air) (NN ballooning)))
        (. .)))
``` where each capitalized word is a node label and each sentence-capitalized word is a word from the narrative text. In particular, ROOT denotes the root of the tree, S denotes a simple declarative clause, PP denotes a prepositional phrase, IN denotes a preposition, NP denotes a noun phrase, NN denotes a noun, TO denotes the word "to", DT denotes a determiner, JJ denotes an adjective, VP denotes a verb phrase, and VBZ denotes a verb in the third person singular present form. Thus, within parse tree 420, the word "skiing" is a singular noun that is also the only word in a noun phrase. "Hot air ballooning" is another noun phrase, composed of the determiner "hot", the noun "air", and the noun "ballooning".

With reference to FIG. 5, this figure depicts another example of parse tree generation in conjunction with parse tree based vectorization for natural language processing in accordance with an illustrative embodiment. Application 300 in FIG. 3 can be used to generate the depicted parse tree.

Sentence 510 is an exemplary sentence within a corpus: "The dollar has hit its highest level against the euro in almost three months after the Federal Reserve head said the US trade deficit is set to stabilize." A corresponding parse tree, parse tree 520, for this sentence, using the same parse tree labeling scheme, is:

```
(ROOT
    (S
        (NP (DT The) (NN dollar))
        (VP (VBZ has)
            (VP (VBN hit)
                (NP
                    (NP (PRP$ its) (JJS highest) (NN level))
                    (PP (IN against)
```

-continued

```
        (NP
            (NP (DT the) (NN euro))
            (PP (IN in)
                (NP (RB almost) (CD three) (NNS months))))))
    (SBAR (IN after)
        (S
            (NP (DT the) (NNP Federal) (NNP Reserve) (NN head))
            (VP (VBD said)
                (SBAR
                    (S
                        (NP (DT the) (NNP US) (NN trade) (NN deficit))
                        (VP (VBZ is)
                            (VP (VBN set)
                                (S
                                    (VP (TO to)
                                        (VP (VB stabilize)))))))))))
(. .)))
``` where, in addition to the labels defined herein, PRP$ denotes a possessive pronoun, JJS denotes a superlative adjective, RB denotes an adverb, CD denotes a cardinal number, NNS denotes a plural noun, SBAR denotes a clause introduced by a subordinating conjunction, and VBD denotes a verb in the past tense.

Figure 6:
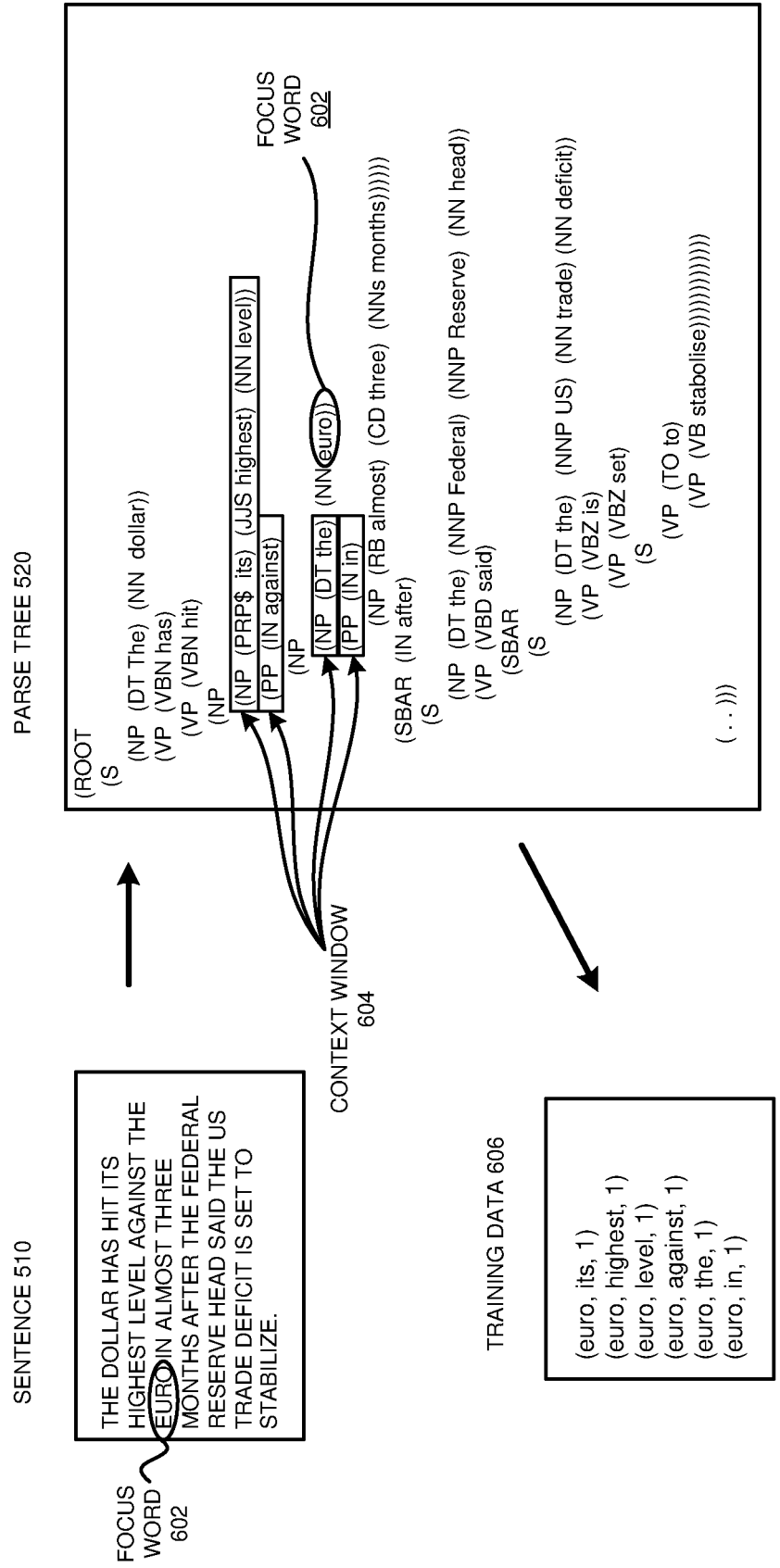
FIG. 6 depicts an example of training data generation using parse tree based vectorization for natural language processing in accordance with an illustrative embodiment.

With reference to FIG. 6, this figure depicts an example of training data generation using parse tree based vectorization for natural language processing in accordance with an illustrative embodiment. Sentence 510 and parse tree 520 are the same as sentence 510 and parse tree 520 in FIG. 5 and can be generated using application 300 in FIG. 3.

Exemplary focus word 602 within sentence 510 and parse tree 520 is "euro". In parse tree 520, "its", "highest", "level", "against", "the", and "in" are all one link away from "euro". Context window 604 has a size of one, and therefore "its", "highest", "level", "against", "the", and "in" are all within context window 604.

Training data 606 depicts pairs of training data, each with a corresponding weight, corresponding to focus word 602 and the words within context window 604. Training data 606 uses the format (focus word, context word, weight). Because context window 604 has a size of one, each pair within training data 606 has an equal weight—here, set to one.

Figure 7:
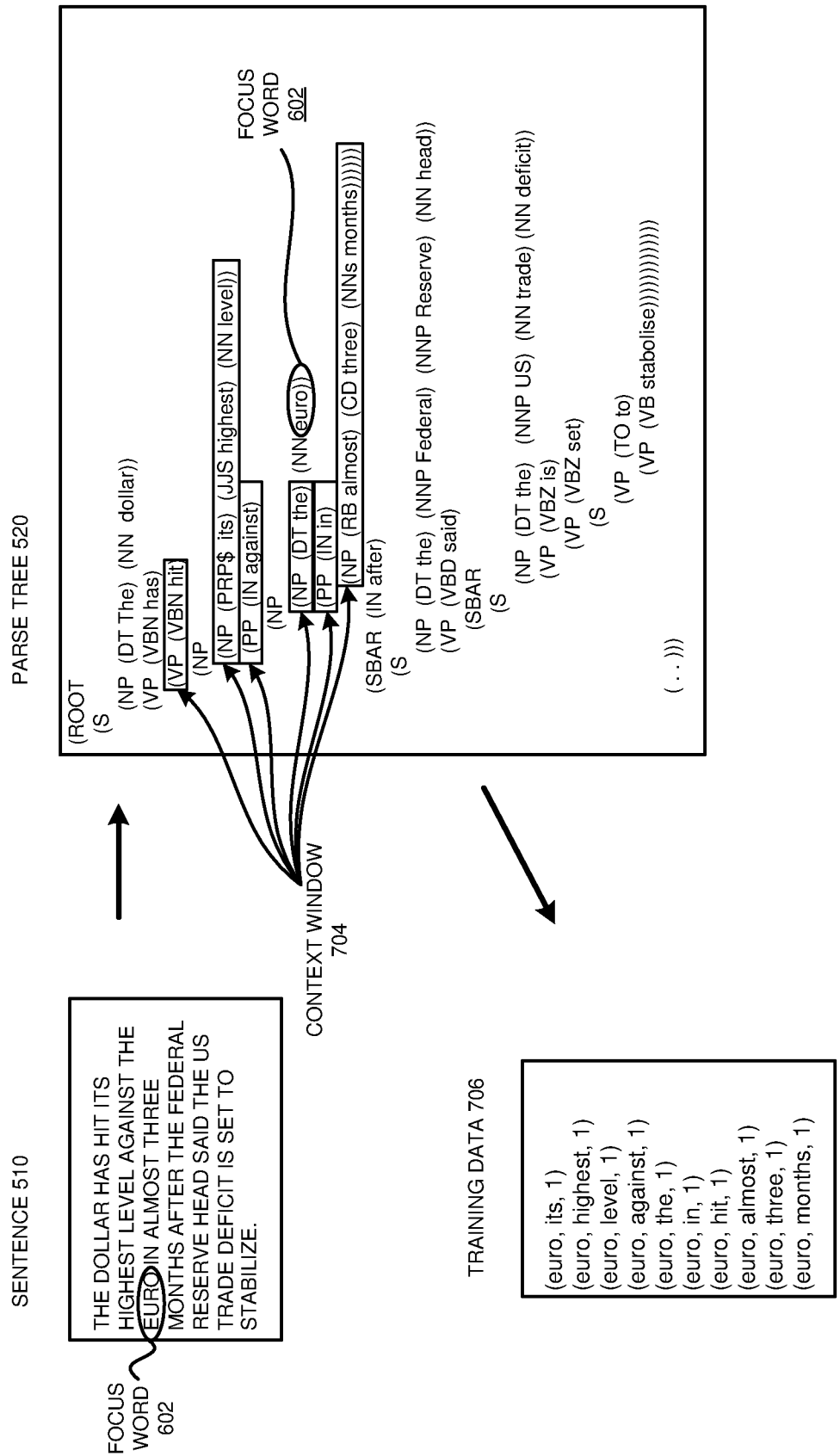
FIG. 7 depicts another example of training data generation using parse tree based vectorization for natural language processing in accordance with an illustrative embodiment.

With reference to FIG. 7, this figure depicts another example of training data generation using parse tree based vectorization for natural language processing in accordance with an illustrative embodiment. Sentence 510, parse tree 520, and focus word 602 are the same as sentence 510, parse tree 520, and focus word 602 in FIG. 6 and can be generated using application 300 in FIG. 3.

Exemplary focus word 602 within sentence 510 and parse tree 520 is "euro". In parse tree 520, "its", "highest", "level", "against", "the", and "in" are all one link away from "euro". "Hit", "almost", "three", and "months" are all two links away from "euro". Context window 704 has a size of two, and therefore "its", "highest", "level", "against", "the", "in", "hit", "almost", "three", and "months" are all within context window 704.

Training data 706 depicts pairs of training data, each with a corresponding weight, corresponding to focus word 602 and the words within context window 704. Training data 706 uses the format (focus word, context word, weight). Application 300 has been configured to weight all pairs of training data equally, regardless of parse tree distance from focus word 602. Thus, each pair within training data 706 has an equal weight—here, set to one.

Figure 8:
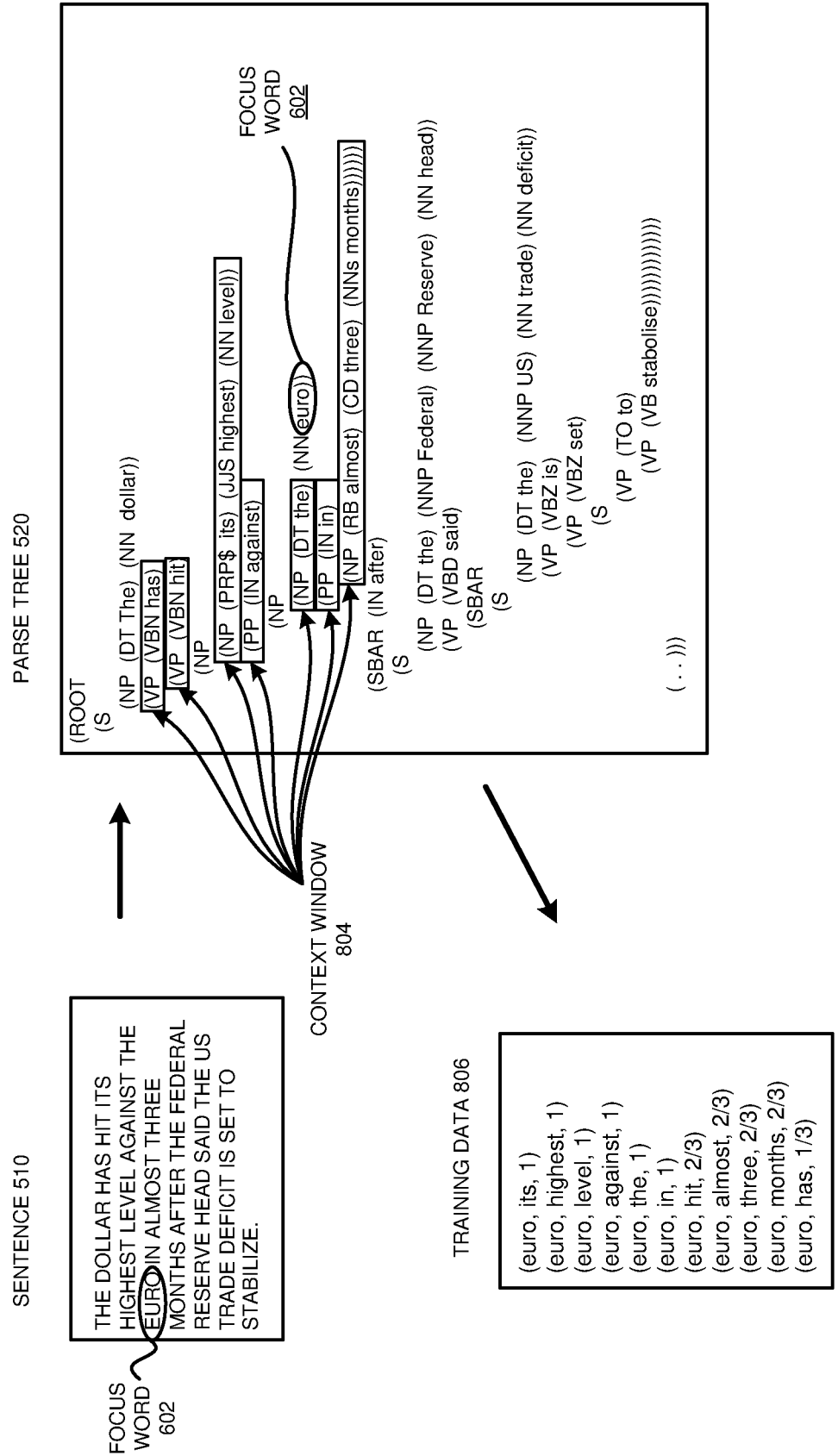
FIG. 8 depicts another example of training data generation using parse tree based vectorization for natural language processing in accordance with an illustrative embodiment.

With reference to FIG. 8, this figure depicts another example of training data generation using parse tree based vectorization for natural language processing in accordance with an illustrative embodiment. Sentence 510, parse tree 520, and focus word 602 are the same as sentence 510, parse tree 520, and focus word 602 in FIG. 6 and can be generated using application 300 in FIG. 3.

Exemplary focus word 602 within sentence 510 and parse tree 520 is "euro". In parse tree 520, "its", "highest", "level", "against", "the", and "in" are all one link away from "euro". "Hit", "almost", "three", and "months" are all two links away from "euro". And "has" is three links away from "euro". Context window 804 has a size of three, and therefore "its", "highest", "level", "against", "the", "in", "hit", "almost", "three", "months", and "has" are all within context window 804.

Training data 806 depicts pairs of training data, each with a corresponding weight, corresponding to focus word 602 and the words within context window 804. Training data 806 uses the format (focus word, context word, weight). Application 300 has been configured to weight pairs of training data according to the expression weight=(context window size−parse tree distance)/context window size. Thus, the weight for a context word one parse tree link away from focus word 804 is 3/3, the weight for a context word two links away from focus word 804 is 2/3, and the weight for a context word three links away from focus word 804 is 1/3.

Figure 9:
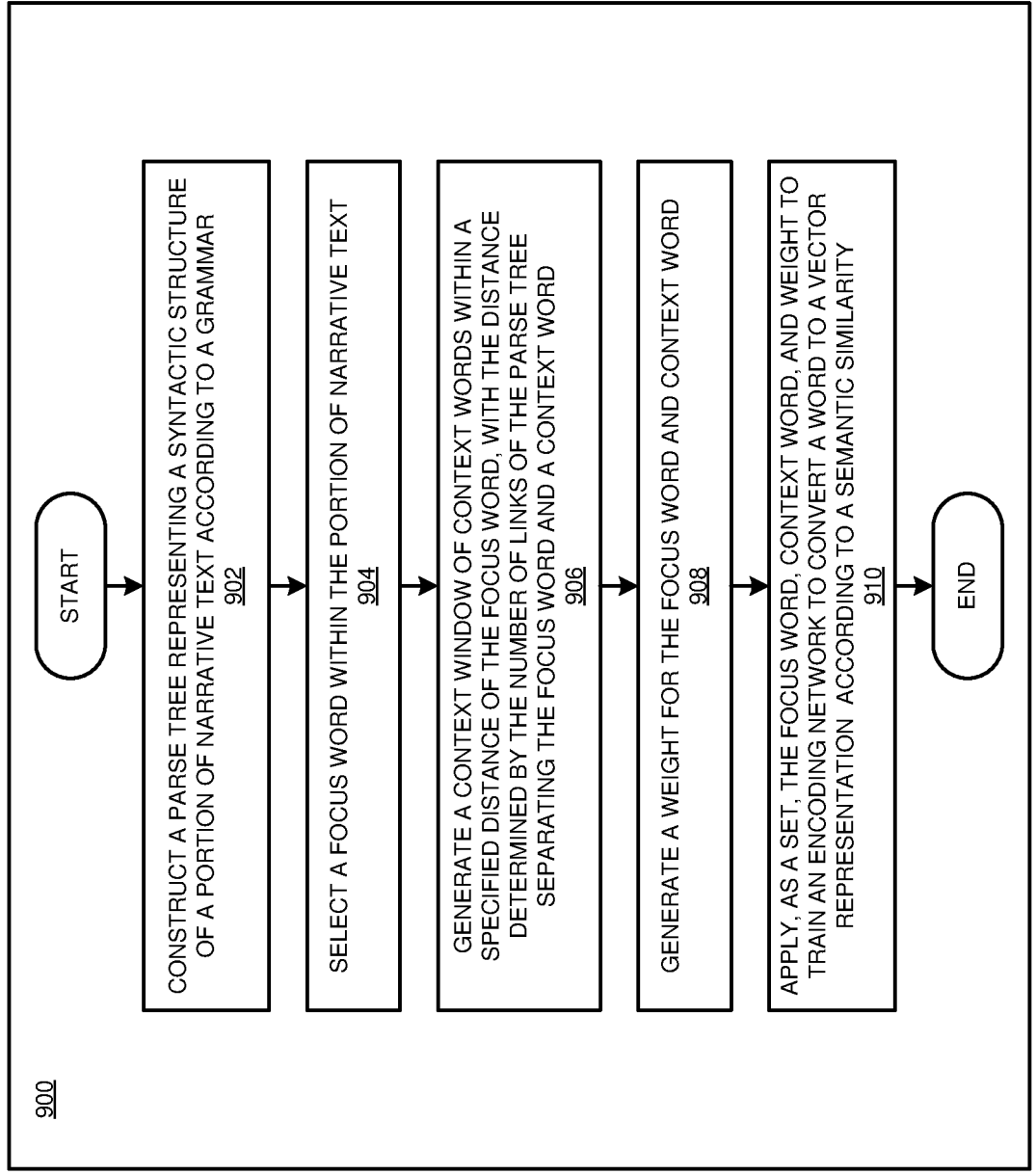
FIG. 9 depicts a flowchart of an example process for parse tree based vectorization for natural language processing in accordance with an illustrative embodiment.

With reference to FIG. 9, this figure depicts a flowchart of an example process for parse tree based vectorization for natural language processing in accordance with an illustrative embodiment. Process 900 can be implemented in application 300 in FIG. 3.

In block 902, the application constructs a parse tree representing a syntactic structure of a portion of narrative text according to a grammar. In block 904, the application selects a focus word within the portion of narrative text. In block 906, the application generates a context window of context words within a specified distance of the focus word, with the distance determined by the number of links of the parse tree separating the focus word and a context word. In block 908, the application generates a weight for a focus word-context word pair. In block 910, the application applies, as a set, the focus word, context word, and weight to train an encoding neural network to convert a word to a vector representation according to a semantic similarity. Then the application ends.

Thus, a computer implemented method, system or apparatus, and computer program product are provided in the illustrative embodiments for parse tree based vectorization for natural language processing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

constructing a parse tree corresponding to a portion of narrative text, wherein the parse tree comprises a data structure representing a syntactic structure of the portion of narrative text as a set of tokens according to a grammar;

generating, using a token in the parse tree as a focus word, a context window comprising a set of words within a specified distance from the focus word, the distance determined according to a number of links of the parse tree separating the focus word and a context word in the set of words;

generating, for the focus word and the context word, a weight; and generating, using the weight, a first vector representation of a first word, the first word being within a second portion of narrative text.

2. The method of claim 1, further comprising:

training an encoding network to convert a word to a vector representation according to a semantic similarity, by applying to the encoding network a training data set comprising the focus word, the context word, and the weight.

3. The method of claim 1, wherein the weight is a constant.

4. The method of claim 1, wherein the weight corresponds to the number of links of the parse tree separating the focus word and the context word.

5. The method of claim 4, further comprising determining the weight by:

subtracting the number of links from the specified distance; and dividing the subtraction result by the specified distance.

6. The method of claim 4, wherein the weight decreases exponentially according to the number of links.

7. The method of claim 1, further comprising:

generating, using the weight, a second vector representation of a second word, the second word being within a third portion of narrative text;

computing, using the first vector representation and the second vector representation, a measure of distance between the first word and the second word.

8. The method of claim 7, wherein the measure of distance comprises a cosine similarity.

9. A computer usable program product comprising one or more computer-readable storage devices, and program instructions stored on at least one of the one or more storage devices, the stored program instructions comprising:

program instructions to construct a parse tree corresponding to a portion of narrative text, wherein the parse tree comprises a data structure representing a syntactic structure of the portion of narrative text as a set of tokens according to a grammar;

program instructions to generate, using a token in the parse tree as a focus word, a context window comprising a set of words within a specified distance from the focus word, the distance determined according to a number of links of the parse tree separating the focus word and a context word in the set of words;

program instructions to generate, for the focus word and the context word, a weight; and program instructions to generate, using the weight, a first vector representation of a first word, the first word being within a second portion of narrative text.

10. The computer usable program product of claim 9, further comprising:

program instructions to train an encoding network to convert a word to a vector representation according to a semantic similarity, by applying to the encoding network a training data set comprising the focus word, the context word, and the weight.

11. The computer usable program product of claim 9, wherein the weight is a constant.

12. The computer usable program product of claim 9, wherein the weight corresponds to the number of links of the parse tree separating the focus word and the context word.

13. The computer usable program product of claim 12, further comprising program instructions to determine the weight by:

subtracting the number of links from the specified distance; and dividing the subtraction result by the specified distance.

14. The computer usable program product of claim 12, wherein the weight decreases exponentially according to the number of links.

15. The computer usable program product of claim 9, further comprising:

program instructions to generate, using the weight, a second vector representation of a second word, the second word being within a third portion of narrative text;

program instructions to compute, using the first vector representation and the second vector representation, a measure of distance between the first word and the second word.

16. The computer usable program product of claim 15, wherein the measure of distance comprises a cosine similarity.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to program instructions to construct a parse tree corresponding to a portion of narrative text, wherein the parse tree comprises a data structure representing a syntactic structure of the portion of narrative text as a set of tokens according to a grammar;

program instructions to generate, using a token in the parse tree as a focus word, a context window comprising a set of words within a specified distance from the focus word, the distance determined according to a number of links of the parse tree separating the focus word and a context word in the set of words;

program instructions to generate, for the focus word and the context word, a weight; and program instructions to generate, using the weight, a first vector representation of a first word, the first word being within a second portion of narrative text.

20. The computer system of claim 19, further comprising:
program instructions to train an encoding network to convert a word to a vector representation according to a semantic similarity, by applying to the encoding network a training data set comprising the focus word, the context word, and the weight.

* * * * *